US012580357B2

(12) United States Patent
Scelle et al.

(10) Patent No.: US 12,580,357 B2
(45) Date of Patent: Mar. 17, 2026

(54) PULSE MODIFICATION APPARATUS COMPRISING AT LEAST ONE PULSE STRETCHING AND/OR PULSE COMPRESSION DEVICE

(71) Applicant: TRUMPF Laser GmbH, Schramberg (DE)

(72) Inventors: Raphael Scelle, Villingen-Schwenningen (DE); Holger Diekamp, Villingen-Schwenningen (DE); Aleksander Budnicki, Waldkirch (DE)

(73) Assignee: TRUMPF LASER GMBH, Schramberg (DE)

( * ) Notice: Subject to any disclaimer, the term of this patent is extended or adjusted under 35 U.S.C. 154(b) by 326 days.

(21) Appl. No.: 18/408,618

(22) Filed: Jan. 10, 2024

(65) Prior Publication Data

US 2024/0146010 A1    May 2, 2024

Related U.S. Application Data

(63) Continuation of application No. PCT/EP2022/065418, filed on Jun. 7, 2022.

(30) Foreign Application Priority Data

Jul. 12, 2021    (DE) .......................... 102021207334.4

(51) Int. Cl.
*H01S 3/00*                (2006.01)
(52) U.S. Cl.
CPC .......... *H01S 3/0057* (2013.01); *H01S 3/0014* (2013.01)

(58) Field of Classification Search
CPC ................ H01S 3/0057; H01S 3/0014; H01S 3/10053; H01S 3/067
See application file for complete search history.

(56) References Cited

U.S. PATENT DOCUMENTS

| | | | |
|---|---|---|---|
| 7,822,347 B1 | 10/2010 | Brennan, III et al. | |
| 8,150,271 B1 | 4/2012 | Brennan, III et al. | |
| 9,711,931 B1 | 7/2017 | Qian et al. | |
| 11,205,883 B2 * | 12/2021 | Budnicki ............. | B23K 26/064 |
| 11,444,425 B2 | 9/2022 | Yusim et al. | |

(Continued)

FOREIGN PATENT DOCUMENTS

| | | |
|---|---|---|
| CN | 111490457 A | 8/2020 |
| EP | 3578287 A1 | 12/2019 |

(Continued)

*Primary Examiner* — Charles S Chang
(74) *Attorney, Agent, or Firm* — LEYDIG, VOIT & MAYER, LTD.

(57) ABSTRACT

A pulse modification apparatus includes at least one pulse stretcher for dispersive stretching of laser pulses and/or at least one pulse compressor for dispersive compression of the laser pulses, an actuator for setting a dispersion of the at least one pulse stretcher or a dispersion of the at least one pulse compressor by setting at least one manipulated variable, a controller for controlling the actuator based on a measurement signal, and an ambient sensor for detecting at least one ambient parameter as the measurement signal. The dispersion of the at least one pulse stretcher or the dispersion of the at least one pulse compressor is dependent on the at least one ambient parameter.

14 Claims, 3 Drawing Sheets

(56) References Cited

U.S. PATENT DOCUMENTS

| | | | |
|---|---|---|---|
| 2002/0044338 | A1 | 4/2002 | Walker et al. |
| 2006/0056480 | A1 | 3/2006 | Mielke et al. |
| 2006/0285561 | A1 | 12/2006 | Shah et al. |
| 2009/0216494 | A1 | 8/2009 | Stadler et al. |
| 2013/0272328 | A1 | 10/2013 | Gobert et al. |
| 2013/0279529 | A1 | 10/2013 | Miesak |
| 2019/0173254 | A1 | 6/2019 | Trépanier et al. |
| 2021/0336415 | A1 | 10/2021 | Chen et al. |

FOREIGN PATENT DOCUMENTS

| | | | |
|---|---|---|---|
| JP | 2008518488 | A | 5/2008 |
| JP | 2014503850 | A | 2/2014 |
| WO | WO 2009126810 | A2 | 10/2009 |
| WO | WO 2018183683 | A1 | 10/2018 |
| WO | WO 2023285030 | A1 | 1/2023 |

* cited by examiner

PULSE MODIFICATION APPARATUS COMPRISING AT LEAST ONE PULSE STRETCHING AND/OR PULSE COMPRESSION DEVICE

CROSS REFERENCE TO RELATED APPLICATIONS

This application is a continuation of International Application No. PCT/EP2022/065418 (WO 2023/285030 A1), filed on Jun. 7, 2022, and claims benefit to German Patent Application No. DE 10 2021 207 334.4, filed on Jul. 12, 2021. The aforementioned applications are hereby incorporated by reference herein.

FIELD

Embodiments of the present invention relate to a pulse modification apparatus.

BACKGROUND

Laser pulses, in particular ultrashort laser pulses, i.e. laser pulses having pulse durations in the picoseconds range or shorter, find application in numerous technological fields, for example in material processing including laser welding and laser cutting. One important variable in the description of laser pulses is the phase of the electric field of the laser pulses in the frequency domain, the so-called spectral phase. A distinction can thus be drawn between unchirped laser pulses, which have a spectral phase which is constant or linearly dependent on frequency, and chirped laser pulses, the spectral phase of which has a more complex frequency dependence. Put simply, in a chirped laser pulse, specific spectral components, for example lower-frequency spectral components, lead other spectral components, for example higher-frequency spectral components. Unchirped laser pulses are distinguished by a minimum pulse duration for a given spectral width.

The properties of laser pulses can be influenced in a targeted manner by means of devices which have different effects on the individual spectral components of the laser pulses, i.e. which are dispersive, in particular by means of devices which alter the spectral phase. High pulse qualities, short pulse durations and high pulse intensities are generally desired. Pulse stretching devices for dispersive stretching of laser pulses and pulse compression devices for dispersive compression of laser pulses are of particular importance. Unchirped and chirped laser pulses can be temporally stretched by means of pulse stretching devices. The resulting temporally stretched laser pulses are then chirped or more intensely chirped. Chirped laser pulses can be temporally compressed by means of pulse compression devices. The resulting temporally compressed laser pulses are then less intensely chirped or unchirped.

Pulse stretching and pulse compression devices are often used together in combination with a seed laser and an amplifying device for generating ultrashort laser pulses with extremely high pulse intensities. The principle is known by the name chirped pulse amplification. In this case, laser pulses of the seed laser, for example a fibre laser, are first temporally stretched by means of at least one pulse stretching device. The stretched laser pulses are subsequently amplified in the amplifying device, for example in a fibre amplifier. After amplification, the amplified laser pulses are temporally compressed again by means of at least one pulse compression device. Without the temporal stretching before amplification, owing to the high-intensity and attendant non-linear effects, the amplifier medium of the amplifying device would be damaged or destroyed and the pulse properties would be impaired.

As a generalization, within the meaning of this application, a pulse modification apparatus denotes an apparatus for influencing the properties of laser pulses in a targeted manner In particular, a pulse modification apparatus can comprise at least one pulse stretching device and/or at least one pulse compression device. In the simplest case, the pulse modification apparatus then comprises just one pulse stretching device or just one pulse compression device. Alternatively, however, a pulse modification apparatus can also be an amplifier system for chirped pulse amplification of laser pulses which comprises both at least one pulse stretching device and at least one pulse compression device.

For a start, pulse stretching and pulse compression devices can be realized as free-space devices. These include grating and prism stretchers, or grating and prism compressors, in which at least one grating or prism, respectively, serves for separating and combining the individual spectral components. The separated spectral components have different propagation times in the stretchers or compressors before they are combined again, which leads to the desired temporal stretching or compression, respectively. Alternatively, pulse stretching and pulse compression devices can also be realized on the basis of a Bragg grating with a locally varying grating constant. The Bragg grating can be inscribed in an optical fibre, for example. This case is referred to as a fibre Bragg grating.

The dispersion of a pulse stretching or pulse compression device can be described mathematically by way of the accumulated spectral phase, $\varphi(\omega)$, of the laser pulses during propagation through the pulse stretching or pulse compression device. In this case, the pulse stretching or pulse compression device is typically characterized by way of the coefficients, $\beta_i$, of a Taylor expansion $$\varphi(\omega) = \beta_0 + \beta_1(\omega - \omega_0) + \frac{\beta_2}{2}(\omega - \omega_0)^2 + \frac{\beta_3}{6}(\omega - \omega_0)^3 + \dots$$

at the angular frequency, $\omega$, about the central frequency, $\omega_0$, of the laser pulses. What is of importance in particular is the group delay dispersion, $\beta_2$, which describes the temporal divergence or convergence of the lowest-order laser pulses. In the case of highly dispersive pulse stretching and pulse compression devices, however, the higher orders, in particular the third-order dispersion, $\beta_3$, also play a part.

The prior art furthermore describes devices for setting the dispersion of a pulse stretching and/or pulse compression device or of an apparatus comprising a pulse stretching device and/or a pulse compression device. An accurate setting of the dispersion is important in order to attain the highest possible pulse quality, in particular the shortest possible pulse duration.

In this regard, EP 3 578 287 A1 discloses a laser system comprising a laser pulse source and a dispersion adjusting unit for pulse stretching or pulse compression of laser pulses with an arrangement comprising at least one dispersive element for generating angular dispersion and an optical unit arranged in the angular dispersion region. The optical unit comprises a plane-parallel optical plate that transmits the laser pulses and causes an entrance-angle-dependent parallel offset of the individual spectral components of the laser pulses. A rotation of the optical plate influences the dispersion properties of the dispersion adjusting unit. In particular, a rotation of the optical plate makes it possible to set the pulse duration of the laser pulses in an output beam of the laser system. In one example, the known laser system furthermore comprises a pulse duration measuring apparatus and a control unit. The pulse duration measuring apparatus serves for outputting a pulse-duration-dependent measurement signal to the control unit. The control device serves for controlling an angle setting apparatus for setting an angular position of the optical plate depending on the pulse duration measurement.

U.S. Pat. No. 7,822,347 B1 furthermore discloses a chirped pulse amplification system comprising a pulse generator, a pulse stretcher, a pulse amplifier and a pulse compressor, and also a setting element and a pulse measuring device. The setting element is suitable for setting the group velocity dispersion of the chirped pulse amplification system and for regulating the pulse duration of the compressed pulses. By means of the setting element, either the dispersion of one of the elements already present in the chirped pulse amplification system, for example the pulse stretcher or the pulse compressor, can be set or there is an additional dispersive element in the chirped pulse amplification system. The pulse measuring device is suitable for measuring at least one pulse property of the compressed pulses for example by way of multiphoton detection, an autocorrelator or by way of a FROG (Frequency-Resolved Optical Gating) system. The setting element is furthermore configured to react to an output signal of the pulse measuring device. In one example, the setting element serves to compensate for alterations of the dispersion which are attributable to alterations in the surroundings or the optical path length of free-space elements. In further examples, the setting element is configured to apply a temperature gradient or a strain gradient to a fibre Bragg grating.

In general, however, known pulse measuring devices, including those mentioned above, have a relatively complex set-up and are comparatively expensive.

SUMMARY

Embodiments of the present invention provide a pulse modification apparatus. The pulse modification apparatus includes at least one pulse stretcher for dispersive stretching of laser pulses and/or at least one pulse compressor for dispersive compression of the laser pulses, an actuator for setting a dispersion of the at least one pulse stretcher or a dispersion of the at least one pulse compressor by setting at least one manipulated variable, a controller for controlling the actuator based on a measurement signal, and an ambient sensor for detecting at least one ambient parameter as the measurement signal. The dispersion of the at least one pulse stretcher or the dispersion of the at least one pulse compressor is dependent on the at least one ambient parameter.

BRIEF DESCRIPTION OF THE DRAWINGS

Subject matter of the present disclosure will be described in even greater detail below based on the exemplary figures. All features described and/or illustrated herein can be used alone or combined in different combinations. The features and advantages of various embodiments will become apparent by reading the following detailed description with reference to the attached drawings, which illustrate the following.

DETAILED DESCRIPTION

Figure 1:
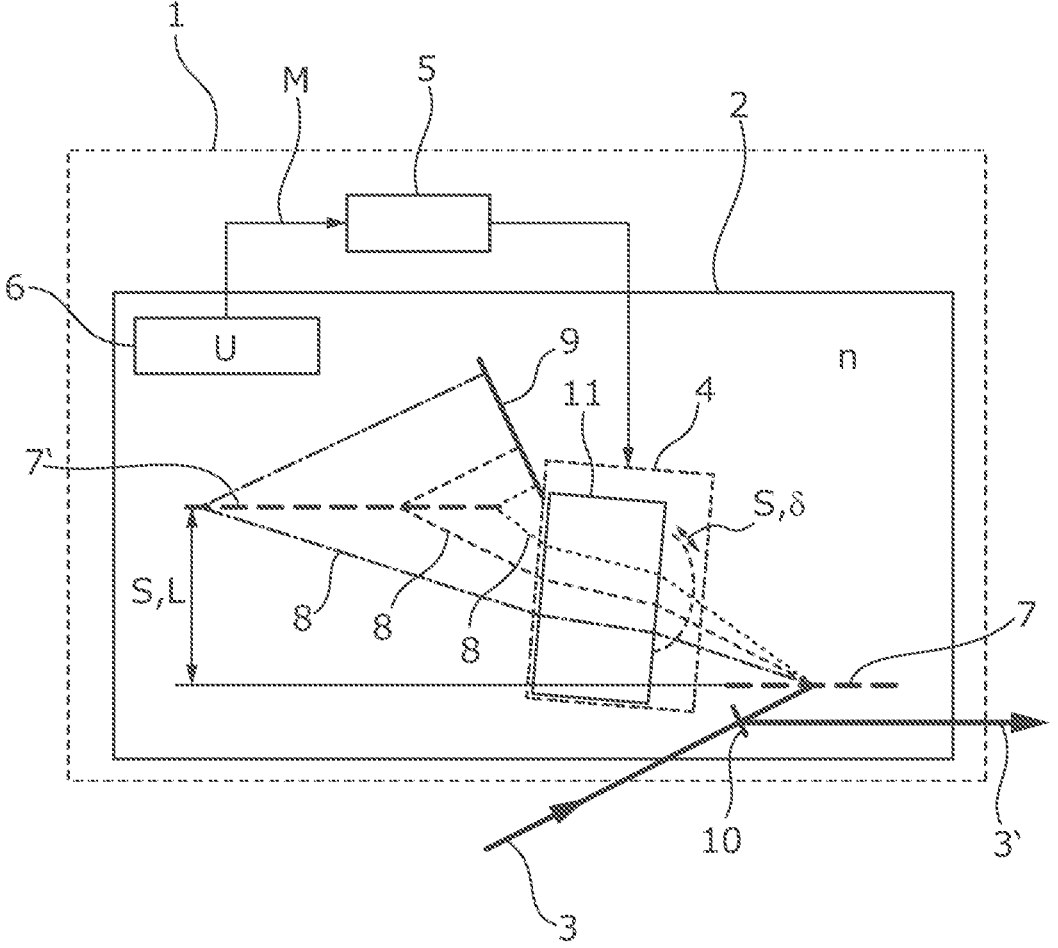
FIG. 1 shows a schematic illustration of a pulse modification apparatus according to some embodiments.

Embodiments of the invention provide a pulse modification apparatus comprising a pulse stretching device and/or a pulse compression device in which the emerging laser pulses have constant pulse properties independently of at least one ambient parameter and which at the same time has a simple and cost-effective set-up.

In accordance with a first aspect, a pulse modification apparatus comprises one or a plurality of pulse stretching devices for dispersive stretching of laser pulses and/or one or a plurality of pulse compression devices for dispersive compression of laser pulses, an actuating device for setting the dispersion of said one pulse stretching device or of at least one of said plurality of pulse stretching devices and/or the dispersion of said one pulse compression device or of at least one of said plurality of pulse compression devices by way of at least one manipulated variable, and also a control device for controlling the actuating device depending on a measurement signal, and an ambient sensor device for detecting at least one ambient parameter, on which the dispersion of said one pulse stretching device or of at least one of said plurality of pulse stretching devices and/or the dispersion of said one pulse compression device or of at least one of said plurality of pulse compression devices are/is dependent, as measurement signal.

The ambient sensor device, the control device and the actuating device serve to compensate for alterations of the dispersion of said one pulse stretching device or of at least one of said plurality of pulse stretching devices and/or the dispersion of said one pulse compression device or of at least one of said plurality of pulse compression devices which result from alterations of the at least one ambient parameter. In this case, the compensation can be effected in full or in part. If the pulse modification apparatus has a plurality of pulse stretching devices and/or a plurality of pulse compression devices or else both one pulse stretching device and one pulse compression device, then the control device is preferably configured to compensate for the cumulated alteration of the dispersion.

For example, the dispersion of at least one pulse stretching device and/or of at least one pulse compression device which exhibits an alteration of the dispersion owing to an alteration of the at least one ambient parameter can be settable by means of the actuating device. Alternatively or additionally, the dispersion of at least one pulse stretching device and/or of at least one pulse compression device whose dispersion is not dependent on the at least one ambient parameter can also be settable by means of the actuating device.

As a consequence of the compensation, the pulse properties remain constant independently of the ambient parameter. If the alteration of the dispersion is not compensated for, then this may lead to an unwanted pulse duration change, for example.

Alterations of the dispersion arise in particular in pulse stretching and pulse compression devices configured as free-space devices, i.e. in pulse stretching and pulse compression devices in which the laser pulses propagate at least partly through air or some other gas atmosphere. Here an alteration of the at least one ambient parameter typically leads to an alteration of the refractive index of the air, or of the gas atmosphere, which in turn causes an alteration of the dispersion.

If the pulse stretching and pulse compression devices in a pulse modification apparatus are equally affected by a refractive index change, the latter does not affect the pulse duration. If they are not affected equally, e.g. in the case of a fibre-optic pulse stretching device and a free-space pulse compression device or if the phases of the pulse stretching device(s) and of the pulse compression device(s) do not mutually compensate for one another, the phase difference between the pulse stretching and pulse compensation devices and thus the pulse duration may change as a result of the refractive index change. This is the case for highly dispersive (i.e. large phase components of orders higher than the second) pulse stretching and pulse compression devices.

By means of the actuating device, in particular, the group delay dispersion of the pulse stretching device and/or pulse compression device is settable by way of the manipulated variable. However, the actuating device can also be configured to set higher dispersion orders.

The control device is for example an electronic device, in particular a computer- or microcontroller-based device. In this case, the measurement signal is an electronic signal and the actuating device is controlled electronically. In order to be able to set the dispersion by means of the actuating device such that the alteration of the dispersion is compensated for, the relationship between the alteration of the at least one ambient parameter and the alteration of the dispersion or the corresponding adaptation of the manipulated variable can also be stored in the control device; in particular, the control device can be correspondingly programmable. Alternatively, the control device is for example a mechanical device, in particular a passive mechanical device. In this case, the measurement signal can also be a mechanical signal, for example a displacement or a rotation.

The ambient sensor device is preferably suitable for detecting the at least one ambient parameter within or in the vicinity of the pulse stretching device and/or within or in the vicinity of the pulse compression device.

The pulse modification apparatus can comprise for example both one or a plurality of pulse stretching devices and one or a plurality of pulse compression devices. Alternatively, the pulse modification apparatus can also comprise one or a plurality of pulse stretching devices, but no pulse compression device. Finally, the pulse modification apparatus can comprise one or a plurality of pulse compression devices, but no pulse stretching device.

In pulse modification apparatuses comprising both at least one pulse compression device and at least one pulse stretching device, preferably only the at least one pulse compression device is configured as a free-space device, while the at least one pulse stretching device is realized in fibre-optic fashion, for example. While fibre-optic devices typically have a large number of advantages, including the avoidance of complex adjustment, free-space devices can be used at high intensities. High intensities occur for example in pulse compression devices which are part of a pulse modification apparatus for chirped pulse amplification. An alteration of the at least one ambient parameter can lead to an alteration of the refractive index, which in turn causes an alteration of the dispersion of the at least one pulse compression device configured as a free-space device. This is able to be compensated for by way of the ambient sensor device, the control device and the actuating device.

As an alternative to the compensation of the alteration of the dispersion by way of the ambient sensor device, control device and actuating device, the ambient conditions (and thus the refractive index in free-space devices) can also be kept constant. By way of example, the pulse stretching and/or pulse compression devices can be encapsulated and thus (passively) insulated from ambient influences. Moreover, the ambient parameter can be kept constant actively in the pulse stretching and/or pulse compression devices. By way of example, a pump can be used here for the ambient pressure.

In one embodiment, said one pulse stretching device or at least one of said plurality of pulse stretching devices, the dispersion of which is settable by way of the actuating device, and/or said one pulse compression device or at least one of said plurality of pulse compression devices, the dispersion of which is settable by way of the actuating device, comprise(s) at least one dispersive optical element for angle separation and combination of spectral components of the laser pulses. The at least one dispersive optical element is for example at least one diffraction grating or at least one prism. The stretching or compression of the laser pulses is attributable to different propagation times of the spectral components. The dispersion is set by way of influencing of the individual spectral components by means of the actuating device.

In one development of this embodiment, the actuating device has a plane-parallel transmissive optical element arranged such that the angle-separated spectral components of the laser pulses pass through said optical element and experience an incidence-angle-dependent parallel offset, a rotation angle of the plane-parallel transmissive optical element forming the manipulated variable. As a result of a rotation by the rotation angle, the beam path of the spectral components changes, which affects the dispersion of the pulse stretching device and/or of the pulse compression device. Details concerning setting the dispersion by means of a rotation of the plane-parallel transmissive optical element may be found in EP 3 578 287 A1, the content of which is hereby incorporated in its entirety in the present application. In particular, the exact relationship between the rotation angle and the group delay dispersion is set out there. By way of example, the actuating device can have a stepper motor, for example, for rotation purposes.

In a further embodiment, said one pulse stretching device or at least one of said plurality of pulse stretching devices, the dispersion of which is settable by way of the actuating device, and/or said one pulse compression device or at least one of said plurality of pulse compression devices, the dispersion of which is settable by way of the actuating device, comprise(s) two dispersive optical elements and the actuating device is configured to alter a distance between the two dispersive optical elements serving as the manipulated variable. The dispersive optical elements are for example diffraction gratings, which are preferably arranged parallel to one another, or prisms. By way of example, the spectral components of the laser pulses can be separated by means of the first dispersive optical element, parallelized by means of the second dispersive optical element, reflected back by means of a reflective optical element and combined again by means of the dispersive optical elements. Typically, the group delay dispersion is proportional to or linearly dependent on the distance between the two dispersive optical elements. All that is necessary, however, is for the dispersion, in particular the group delay dispersion, to be settable by way of an adaptation of the distance. The actuating device can have a linear actuator, for example, for the purpose of adapting the distance.

In a further embodiment, said one pulse stretching device or at least one of said plurality of pulse stretching devices, the dispersion of which is settable by way of the actuating device, and/or said one pulse compression device or at least one of said plurality of pulse compression devices, the dispersion of which is settable by way of the actuating device, comprise(s) a dispersive optical element and a deflection device and the actuating device is configured to alter a distance between the dispersive optical element and the deflection device serving as the manipulated variable. The deflection device is a deflection prism, for example. Further details concerning such pulse compression or pulse stretching devices may be found in EP 3 578 287 A1.

In a further embodiment, said one pulse stretching device or at least one of said plurality of pulse stretching devices, the dispersion of which is settable by way of the actuating device, comprises a Bragg grating in a transparent material. The Bragg grating is a chirped Bragg grating, i.e. a Bragg grating with a locally varying grating constant. The different spectral components of the laser pulses are reflected at different depths in the Bragg grating, as a result of which the spectral components cover different optical path distances, which ultimately leads to the desired temporal stretching. The transparent material is present in the form of an optical fibre, for example. In this case, the Bragg grating is a fibre Bragg grating. By means of the actuating device, the Bragg grating is able to be influenced in a targeted manner such that the dispersion of the pulse stretching device changes to the desired extent.

In one development of this embodiment, the actuating device comprises a heating and/or cooling device and causes a temperature profile serving as the manipulated variable in the transparent material. By means of the temperature profile, the optical properties of the Bragg grating can be set in a targeted manner; in particular, the dispersion of the pulse stretching device changes as a result. The heating and/or cooling device can be realized by way of one or a plurality of Peltier elements, for example. Alternatively or additionally, the transparent material can be heated by way of the waste heat from an electrical resistor, for example.

In an alternative development, the actuating device is configured to cause a profile—serving as the manipulated variable—of a mechanical stress in the transparent material, in particular a tensile stress acting on the transparent material. In particular, an optical fibre with an inscribed fibre Bragg grating can be stretched by means of a tensile stress and a suitable adaptation of the dispersion can thus be attained.

In accordance with a further aspect, the object mentioned in the introduction is achieved by means of a pulse modification apparatus, comprising one or a plurality of pulse stretching devices for dispersive stretching of laser pulses and/or one or a plurality of pulse compression devices for dispersive compression of laser pulses, a modulation device for dispersive modulation of the laser pulses, an actuating device for setting the dispersion of the modulation device, and a control device for controlling the actuating device depending on a measurement signal, and an ambient sensor device for detecting at least one ambient parameter, on which the dispersion of said one pulse stretching device or of at least one of said plurality of pulse stretching devices and/or the dispersion of said one pulse compression device or of at least one of said plurality of pulse compression devices are/is dependent, as measurement signal.

The modulation device comprises for example at least one dispersive element for separating and combining the spectral components of the laser pulses. The modulation device can furthermore have a spatial light modulator (SLM) or a similar device in order to cause a phase difference for the spectral components individually and independently of one another and thus to influence the spectral phase of the laser pulses. In spatial light modulators, the phase difference is attained by way of a settable alignment of liquid crystals of a liquid crystal layer in a pixel array. The liquid crystals are aligned by way of electric fields generated by virtue of the actuating device having suitable electrodes, for example. In this case, the actuating device is part of the spatial light modulator. With regard to the control device and the ambient sensor device, reference is made to the explanations above.

Preferably, the at least one ambient parameter is a temperature and/or an ambient pressure. The ambient sensor device then has at least one pressure sensor and/or at least one temperature sensor. The pressure sensor can be for example an absolute pressure measuring cell or a piezoresistive or piezoelectric pressure sensor, and the temperature sensor can be a temperature-dependent measuring resistor or a semiconductor temperature sensor. Temperature and pressure changes affect in particular the dispersion of pulse stretching and pulse compression devices configured as free-space devices. Here an alteration of the pressure and/or temperature causes an alteration of the refractive index of the air or the gas atmosphere. The background is that the accumulated spectral phase is not a function of the frequency, but rather of the wavelength which is manifested in the diffraction condition and the optical path length. The accumulated spectral phase thus changes if the wavelength changes as a result of a change in the refractive index (by contrast, the frequency does not change). The dependence between the temperature and the ambient pressure, on the one hand, and the refractive index, on the other hand, arises from the so-called Edlén formula, for example, for air. The ambient pressure is in particular weather- and height-dependent. However, the at least one ambient parameter can also be moisture, for example air humidity.

In a further embodiment, the control device is configured to control the actuating device depending on the measurement signal on the basis of an experimentally determined calibration curve describing the dependence of the dispersion of said one pulse stretching device or of said at least one of said plurality of pulse stretching devices and/or the dispersion of said one pulse compression device or of said at least one of said plurality of pulse compression devices on the at least one ambient parameter. For the compensation of the alteration of the dispersion, the relationship between the at least one ambient parameter and the dispersion has to be known. This relationship can be determined experimentally as a calibration curve that is saved or stored in the control device, for example.

In a further embodiment, the control device is configured to control the actuating device depending on the measurement signal on the basis of a mathematical relationship of the form $$d\beta_2 = F(\beta_3, \beta_4, \ldots, \beta_m, \omega_0, dn)$$

between an alteration, dn, of a refractive index, n, within said one pulse stretching device or said at least one of said plurality of pulse stretching devices and/or within said one pulse compression device or said at least one of said plurality of pulse compression devices, which alteration results from the alteration of the at least one ambient parameter, the resultant alteration $d\beta_2$ of the group delay dispersion $\beta_2$ and also the higher-order dispersion, $\beta_3, \beta_4, \ldots, \beta_m$, and the central frequency, $\omega_0$, of the laser pulses. The inventors have discovered that in the case of pulse stretching and pulse compression devices in the form of free-space devices, the alteration of the group delay dispersion can be described by way of mathematical relationships of the form indicated. If, in addition to such a mathematical relationship, the relationship between the at least one ambient parameter and the refractive index is known, as in the case of air by way of the Edlén formula, then this gives rise to a relationship between the alteration of the at least one ambient parameter and the alteration of the group delay dispersion. A corresponding control allows a compensation of the alteration of the dispersion, without the need to measure the pulse duration or some other pulse property. The mathematical relationship is saved or stored in the control device, for example.

In one development of this embodiment, the mathematical relationship is as follows: $d\beta_2 = \beta_3 \omega_0 dn$. The mathematical relationship indicated describes the alteration of the group delay dispersion for a given alteration of the refractive index in many cases to at least a good approximation. Out of the higher orders of dispersion, only the third-order dispersion, $\beta_3$, influences the mathematical relationship.

The alteration of the dispersion, in particular the alteration of the pulse duration, as a result of an alteration of the refractive index is relevant primarily in the case of highly dispersive pulse stretching and pulse compression devices. Alternatively, this problem can be solved as a consequence of fewer dispersive pulse stretching and pulse compression devices being used. However, the latter require very large path distances and thus a very large installation space or many folds in the beam path, which makes them more complex and more expensive. The problem does not occur in the case of pulse compression devices on the basis of a volume Bragg grating. At the present time, however, these devices allow smaller stretching factors than free-space pulse compression devices and thus lower pulse energies.

In a further embodiment, the pulse modification apparatus comprises an amplifying device and serves for amplifying the laser pulses according to the principle of chirped pulse amplification. Such a pulse modification apparatus can be part of an ultrashort pulse laser, for example.

Further features and advantages of the invention are evident from the following description of exemplary embodiments of the invention, with reference to the figures of the drawing. The individual features can be realized in each case individually by themselves or as a plurality in any desired combination.

FIG. 1 schematically shows a pulse modification apparatus 1 comprising a pulse compression device 2 for dispersive compression of laser pulses 3, an actuating device 4 for setting the dispersion of the pulse compression device 2 by way of at least one manipulated variable S and also a control device 5 for controlling the actuating device 4 depending on a measurement signal M. The pulse modification apparatus 1 furthermore comprises an ambient sensor device 6 for detecting an ambient parameter U, on which the dispersion of the pulse compression device 2 is dependent, as measurement signal M.

The pulse compression device 2 illustrated is embodied in the form of a grating compressor. It has two dispersive optical elements 7, 7' in the form of diffraction gratings for angle separation and combination of the spectral components 8 of the laser pulses 3. Alternatively, however, the pulse compression device 2 can also have just one or more than two dispersive optical elements 7, 7'. Moreover, the dispersive optical elements 7, 7' need not be diffraction gratings. By way of example, the dispersive optical elements 7, 7' can also be prisms.

The arriving laser pulses 3, which are chirped, firstly impinge on the first dispersive optical element 7, whereby they are separated into their spectral components 8 and propagate in different directions. The spectral components 8 are parallelized by the second dispersive optical element 7' and are subsequently reflected back by a reflective optical element 9. The reflective optical element 9 can be a deflection prism, for example. In this case, the spectral components 8 reflected back are offset in their level, such that the emerging laser pulses 3' can be separated by a separating mirror 10. The individual spectral components 8 have different propagation times in the pulse compression device 2, which leads to the desired temporal compression.

The actuating device 4 illustrated comprises a plane-parallel transmissive optical element 11 arranged such that the angle-separated spectral components 8 pass through said optical element and experience an incidence-angle-dependent parallel offset. The dispersion of the pulse compression device 2, in particular the group delay dispersion thereof, is settable by way of a rotation of the optical element 11 by a rotation angle $\delta$ serving as the manipulated variable S. For the purpose of rotating the optical element 11, the actuating device can have a stepper motor (not illustrated here), for example.

However, the actuating device 4 can also be realized differently. By way of example, a distance L between the dispersive optical elements 7, 7' can serve as the manipulated variable S, and the actuating device 4 can be configured to alter this distance L. For this purpose, the actuating device 4 can have a linear actuator, for example.

Alterations of the dispersion of the pulse compression device 2 which result from an alteration of the ambient parameter U are compensated for by way of the ambient sensor device 6, the control device 5 and the actuating device 4. The pulse properties of the emerging laser pulses 3' thereby remain constant independently of the ambient parameter U.

In the example illustrated, the ambient parameter U is the ambient pressure. The ambient sensor device 6 has a pressure sensor (not illustrated here). However, it is also possible for some other ambient parameter U to be detected, for example the temperature. Moreover, it is possible to detect a plurality of ambient parameters U and to compensate for dispersion changes as a result of alterations of the plurality of ambient parameters U.

The pulse compression device 2 is a free-space device in which the laser pulses 3 or the spectral components 8 thereof propagate at least partly through air. An alteration of the ambient parameter U, e.g. the ambient pressure, then leads to an alteration dn of the refractive index n of air, which in turn causes an alteration of the dispersion. The control device 5 is then configured to control the actuating device 4 depending on the measurement signal M on the basis of a mathematical relationship of the form $d\beta_2 = F(\beta_3, \beta_4, \ldots, \beta_m, \omega_0, dn)$ between the alteration dn of the refractive index n within the pulse compression device 2 and the resultant alteration $d\beta_2$ of the group delay dispersion $\beta_2$ of the pulse compression device 2 and also the central frequency $\omega_0$ of the laser pulses 3 and the higher-order dispersion $\beta_3$, $\beta_4$, . . . , $\beta_m$ of the pulse compression device 2. More precisely, the control device 5 is configured by way of example to control the actuating device 4 depending on the measurement signal M on the basis of the mathematical $$d\beta_2 = \beta_3 \omega_0 dn$$

relationship. Deviations from this mathematical relationship, in particular relatively small deviations, are possible in principle, however. Alternatively, the control device 5 can also be configured to control the actuating device 4 depending on the measurement signal M on the basis of an experimentally determined calibration curve describing the dependence of the dispersion of the pulse compression device 2 on the ambient parameter U.

Instead of a pulse compression device 2, the pulse modification apparatus 1 can also comprise a pulse stretching device. In order to attain a positive dispersion, the pulse stretching device can have two lenses, for example, in addition to the two dispersive optical elements 7, 7'.

Figure 2:
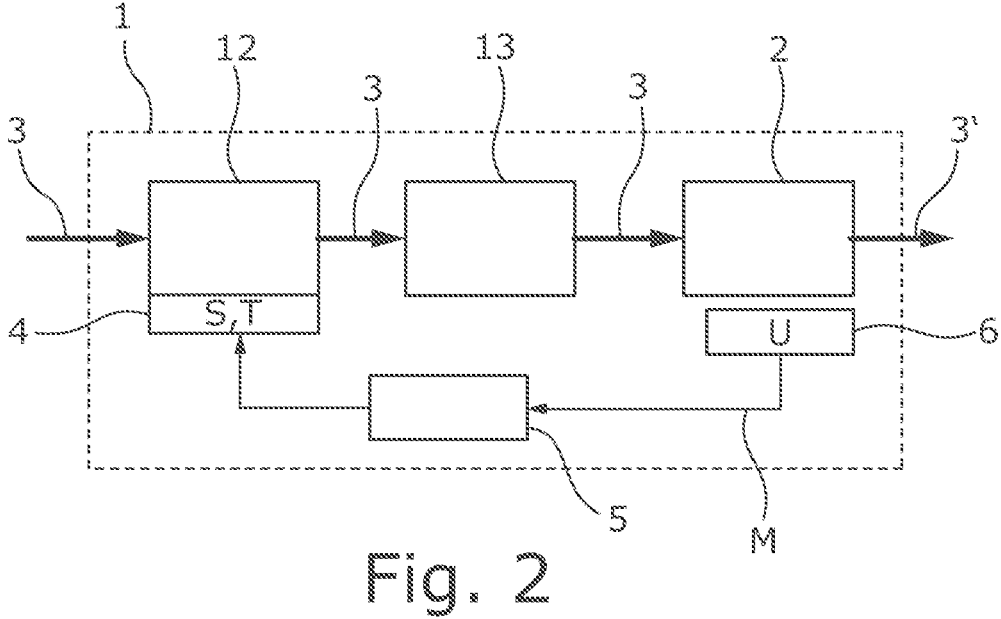
FIG. 2 shows a simplified schematic illustration of a pulse modification apparatus according to some embodiments.
Figure 3:
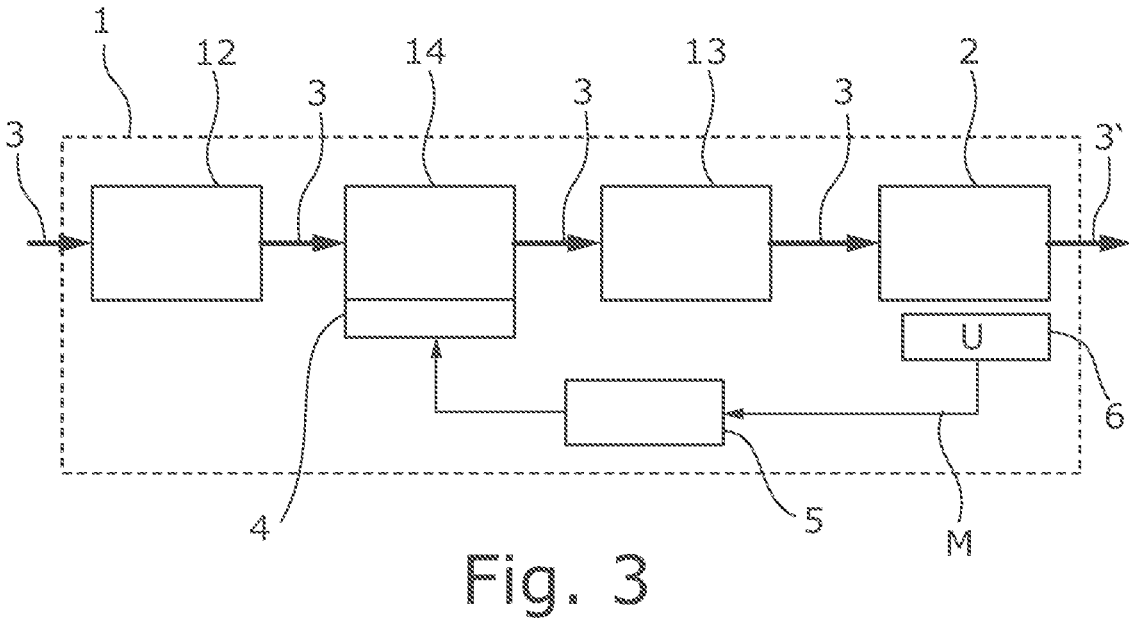
FIG. 3 shows a simplified schematic illustration of a pulse modification apparatus according to some embodiments.

FIG. 2 and FIG. 3 schematically illustrate, in a simplified manner, pulse modification apparatuses 1 comprising a pulse stretching device 12 for dispersive stretching of laser pulses 3 and a pulse compression device 2 for dispersive compression of the laser pulses 3. The pulse modification apparatuses 1 furthermore comprise, by way of example, an amplifying device 13 and serve for amplifying the laser pulses 3 according to the principle of chirped pulse amplification.

The pulse modification apparatuses 1 have an actuating device 4 and also a control device 5 for controlling the actuating device 4 depending on a measurement signal M and an ambient sensor device 6 for detecting an ambient parameter U, on which the dispersion of the pulse compression device 2 is dependent, as measurement signal M. In this example, the pulse compression devices 2 are free-space devices and the ambient parameter U is the ambient pressure. An alteration of the ambient pressure leads to an alteration of the refractive index n and thus the dispersion of the pulse compression devices 2.

In the case of the pulse modification apparatus 1 shown in FIG. 2, the actuating device 4 serves for setting the dispersion of the pulse stretching device 12. In this case, the alteration of the dispersion of the pulse compression device 2 is compensated for by way of the setting of the dispersion of the pulse stretching device 12, such that the pulse properties of the emerging laser pulses 3' remain constant independently of the ambient parameter U. The pulse stretching device 12 has a Bragg grating (not illustrated here) in a transparent material in the form of an optical fibre. The Bragg grating is therefore a fibre Bragg grating in this example. The actuating device 4 comprises a heating and/or cooling device having Peltier elements, which serves to cause a temperature profile T serving as the manipulated variable S in the optical fibre, such that the dispersion of the pulse stretching device 12 changes in such a way that the dispersion change of the pulse compression device 2 is compensated for. However, the actuating device 4 can also be constructed differently. By way of example, the actuating device can cause a tensile stress serving as the manipulated variable S in the optical fibre. Moreover, the transparent material need not be present in the form of an optical fibre.

The pulse modification apparatus 1 shown in FIG. 3 has a modulation device 14 for dispersive modulation of the laser pulses 3. In this case, the alteration of the dispersion of the pulse compression device 2 is compensated for by way of the setting of the dispersion of the modulation device 14, such that the pulse properties of the emerging laser pulses 3' remain constant independently of the ambient parameter U.

The modulation device 14 can comprise for example two diffraction gratings for splitting and combining the spectral components 8 of the laser pulses 3 and a spatial light modulator (SLM) in order to cause a phase difference for the spectral components 8 individually and independently of one another and thus to influence the spectral phase of the laser pulses 3. In the spatial light modulator, the phase difference is attained by way of a settable alignment of liquid crystals of a liquid crystal layer. The actuating device 4 has suitable electrodes for this purpose. However, the modulation device 14 need not be based on a spatial light modulator. In principle, any device that enables the spectral phase of the laser pulses 3 to be set can be used here.

The modulation device 14 illustrated is arranged upstream of the amplifying device 13 in the beam path of the laser pulses 3. In a departure from this, the modulation device 14 can also be arranged at other positions in the beam path, for example upstream of the pulse stretching device 12.

Figure 4:
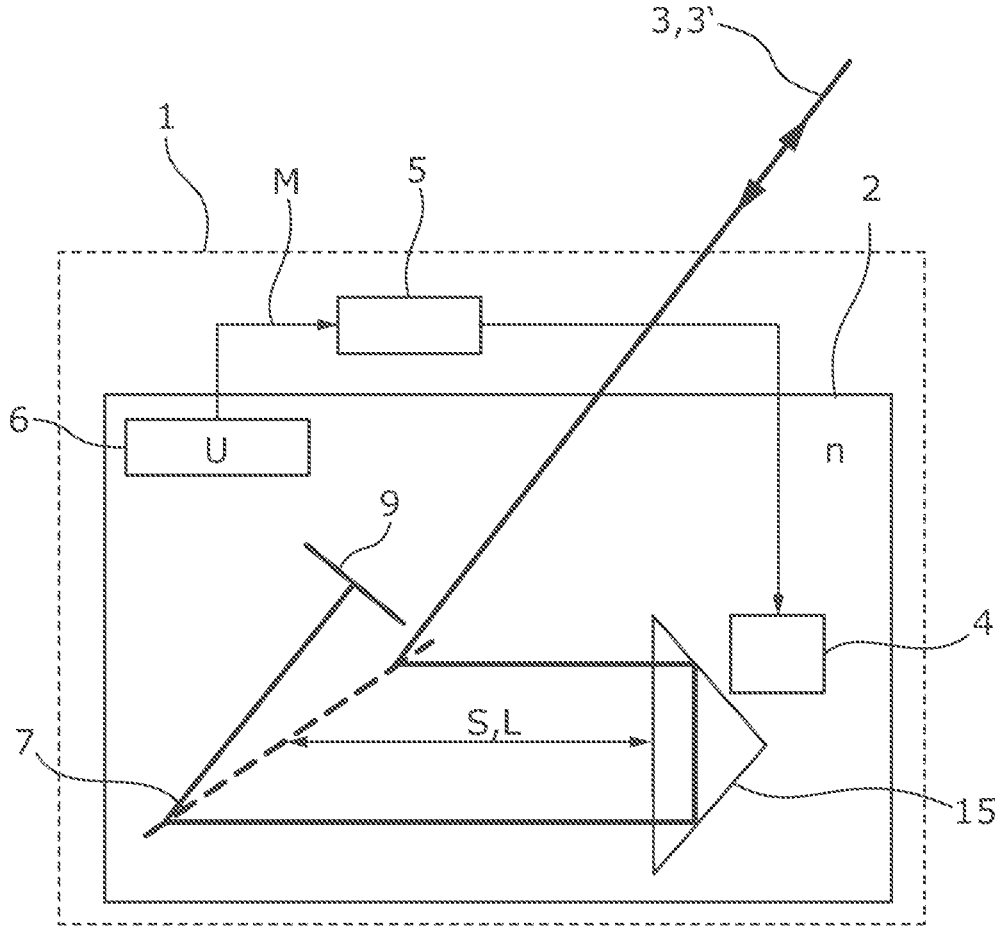
FIG. 4 shows a schematic illustration of a pulse modification apparatus according to some embodiments.

FIG. 4 shows a variant of the pulse modification apparatus 1 illustrated in FIG. 1. In contrast to FIG. 1, the pulse compression device 2 has a deflection device 15 and only one dispersive optical element 7. The actuating device 4 is configured here, by way of example, to alter the distance L between the dispersive optical element 7 and the deflection device 15 serving as the manipulated variable S. Here by way of example, but not necessarily, the deflection device 15 is a deflection prism.

In contrast to what is illustrated in FIGS. 1-4, the pulse modification apparatus 1 can also comprise more than one pulse stretching device 12 and/or more than one pulse compression device 2.

While subject matter of the present disclosure has been illustrated and described in detail in the drawings and foregoing description, such illustration and description are to be considered illustrative or exemplary and not restrictive. Any statement made herein characterizing the invention is also to be considered illustrative or exemplary and not restrictive as the invention is defined by the claims. It will be understood that changes and modifications may be made, by those of ordinary skill in the art, within the scope of the following claims, which may include any combination of features from different embodiments described above.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

The invention claimed is:

1. A pulse modification apparatus, comprising:
at least one pulse stretcher for dispersive stretching of laser pulses and/or at least one pulse compressor for dispersive compression of the laser pulses,
an actuator for setting a dispersion of the at least one pulse stretcher or a dispersion of the at least one pulse compressor by setting at least one manipulated variable,
a controller for controlling the actuator based on a measurement signal, and
an ambient sensor for detecting at least one ambient parameter as the measurement signal, wherein the dispersion of the at least one pulse stretcher or the dispersion of the at least one pulse compressor is dependent on the at least one ambient parameter.

2. The pulse modification apparatus according to claim 1, wherein the at least one pulse stretcher or the at least one pulse compressor comprises at least one dispersive optical element for angle separation and combination of spectral components of the laser pulses.

3. The pulse modification apparatus according to claim 2, wherein the actuator comprises a plane-parallel transmissive optical element arranged such that the angle-separated spectral components of the laser pulses pass through the plane-parallel transmissive optical element and experience an incidence-angle-dependent parallel offset, and wherein a rotation angle of the plane-parallel transmissive optical element forms the at least one manipulated variable.

4. The modification apparatus according to claim 2, wherein the at least one pulse stretcher or the at least one pulse compressor comprises two dispersive optical elements, and the actuator is configured to alter a distance between the two dispersive optical elements, and wherein the distance between the two dispersive optical elements forms the at least one manipulated variable.

5. The pulse modification apparatus according to claim 2, wherein the at least one pulse stretcher or the at least one pulse compressor comprises one dispersive optical element and a deflector, and the actuator is configured to alter a distance between the one dispersive optical element and the deflector, and wherein the distance between the dispersive optical element and the deflector forms the manipulated variable.

6. The pulse modification apparatus according to claim 1, wherein the at least one pulse stretcher comprises a Bragg grating in a transparent material.

7. The pulse modification apparatus according to claim 6, wherein the actuator comprises a heating and/or cooling device configured to cause a temperature profile in the transparent material, the temperature profile serving as the at least one manipulated variable.

8. The pulse modification apparatus according to claim 6, wherein the actuator is configured to cause a profile of a mechanical stress in the transparent material, the profile of the mechanical stress serving as the at least one manipulated variable.

9. A pulse modification apparatus, comprising:
at least one pulse stretcher for dispersive stretching of laser pulses and/or at least one pulse compressor for dispersive compression of the laser pulses,
a modulator for dispersive modulation of the laser pulses,
an actuator for setting a dispersion of the modulator,
a controller for controlling the actuator based on a measurement signal, and
an ambient sensor for detecting at least one ambient parameter as the measurement signal, a dispersion of the at least one pulse stretcher or a dispersion of the at least one pulse compressor is dependent on the at least one ambient parameter.

10. The pulse modification apparatus according to claim 9, wherein the at least one ambient parameter is a temperature and/or an ambient pressure.

11. The pulse modification apparatus according to claim 9, wherein the controller is configured to control the actuator depending on the measurement signal based on an experimentally determined calibration curve describing a relationship between the dispersion of the at least one pulse stretcher or or the dispersion of the at least one pulse compressor and the at least one ambient parameter.

12. The pulse modification apparatus according to claim 9, wherein the controller is configured to control the actuator depending on the measurement signal based on a mathematical relationship of a form $$d\beta_2 = F(\beta_3, \beta_4, \ldots, \beta_m, \omega_0, dn)$$

wherein dn is an alteration of a refractive index within the at least one pulse stretcher or within the at least one pulse compressor, wherein the alteration of the refractive index results from an alteration of the at least one ambient parameter, and wherein $d\beta_2$ is an alteration of a group delay dispersion, $\beta_3$, $\beta_4$, . . . , $\beta_m$ are higher-order dispersions, and $\omega_0$ is a central frequency of the laser pulses.

13. The pulse modification apparatus according to claim 12, wherein the mathematical relationship is as follows:

$$d\beta_2 = \beta_3 \omega_0 dn.$$

14. The pulse modification apparatus according to claim 9, further comprising an amplifier for amplifying the laser pulses according to a principle of chirped pulse amplification.

* * * * *